United States Patent
Bhupathi et al.

(10) Patent No.: US 12,505,031 B2
(45) Date of Patent: Dec. 23, 2025

(54) SYSTEMS AND METHODS FOR GRAPH MANAGEMENT

(71) Applicant: FMR LLC, Boston, MA (US)

(72) Inventors: Krishna Mohan Bhupathi, Cary, NC (US); Maria Lucena, King of Prussia, PA (US); Benjamin Dixon, Atlanta, GA (US); John Martin Arnesen, Maineville, OH (US); Divya Mahajan, Nashua, NH (US)

(73) Assignee: FMR LLC, Boston, MA (US)

( * ) Notice: Subject to any disclaimer, the term of this patent is extended or adjusted under 35 U.S.C. 154(b) by 189 days.

(21) Appl. No.: 18/378,415

(22) Filed: Oct. 10, 2023

(65) Prior Publication Data

US 2025/0117316 A1   Apr. 10, 2025

(51) Int. Cl.
 *G06F 9/44* (2018.01)
 *G06F 11/3698* (2025.01)

(52) U.S. Cl.
 CPC ............................. *G06F 11/3698* (2025.01)

(58) Field of Classification Search
 CPC .................................................. G06F 11/3698
 See application file for complete search history.

(56) References Cited

U.S. PATENT DOCUMENTS

| | | | | |
|---|---|---|---|---|
| 2012/0159425 A1* | 6/2012 | Shukla | ................ | G06F 8/71 717/104 |
| 2017/0090894 A1* | 3/2017 | Maus | ................ | G06F 8/60 |
| 2023/0138971 A1* | 5/2023 | Krishnan | ............ | G06F 16/9024 707/797 |

OTHER PUBLICATIONS

Debergalis, Matt, "The Supergraph: A New Way to Think About GraphQL," Apollo Graph Inc., Blog, Retrieved from the Internet: <https://www.apollographql.com/blog/the-supergraph-a-new-way-to-think-about-graphql>, May 18, 2022, pp. 1-9.

"Supergraph-Specific Studio Features,"Apollo Graph Inc., Retrieved from the Internet: <https://www.apollographql.com/ docs/graphos/ graphs/federated-graphs/>, Published prior to Oct. 10, 2023, pp. 1-17.

* cited by examiner

*Primary Examiner* — Hang Pan (74) *Attorney, Agent, or Firm* — Cesari and McKenna, LLP (57) ABSTRACT

A computer-implemented system is provided for configuring and managing a federation ecosystem implemented in a data query language and comprising a plurality of subgraphs. The system includes a sandbox registry in communication with the subgraphs. The sandbox registry is configured to test and verify changes to the subgraphs to ensure validity of the subgraphs. The system also includes a global registry in communication with the sandbox registry. The global registry is configured to register the subgraphs after the subgraphs are tested and verified by the sandbox registry. The system further includes a portal in communication with the global registry. The portal is configured to present to a user the subgraphs registered with the global registry and receive from the user instructions for combining two or more of the subgraphs to form at least one supergraph.

18 Claims, 6 Drawing Sheets

SYSTEMS AND METHODS FOR GRAPH MANAGEMENT

TECHNICAL FIELD

This application generally relates to systems, methods and apparatuses, including computer program products, for configuring and managing a federation ecosystem implemented in a data query language and comprising multiple subgraphs.

BACKGROUND

GraphQL is a query language for application programming interfaces (APIs) and a query runtime engine for fulfilling those queries relative to existing data of a business enterprise. GraphQL enables declarative data fetching where a user can specify what data he/she needs from one or more APIs associated with the enterprise. In a GraphQL federation, at least one supergraph can be established that combines multiple GraphQL APIs ("subgraphs"), which brings together different services into one API endpoint. That is, in a GraphQL federation, a supergraph allows the user to create a single GraphQL API, or a gateway, which fetches form other APIs ("subgraphs").

As GraphQL federated supergraphs become ubiquitous in enterprises, consumers are faced with increased cognitive load as they must traverse the supergraphs to find data meaningful to their use cases. For example, a business may want to benefit from usage of a supergraph but may need to hide its models due to issues such as intellectual property protection, legal and/or regulatory concerns. For a large organization with many complex domains, it is difficult to balance these concerns with the desire for a unified graph. In today's market, most of the available tools only permit supergraphs to be created one at a time and require manual registration and discovery of capabilities and functions associated with supergraphs. Therefore, there is a need for solutions to automate and centralize the creation and maintenance of GraphQL Federated systems.

SUMMARY OF THE INVENTION

The present invention features a GraphQL ecosystem for composing, publishing and registering subgraphs and supergraphs partitions, fronted by a global registry for configuring and managing the ecosystem in a centralized manner. This system is configured to support automated creation of supergraphs that fit the unique needs defined by each user, where the supergraphs represent partitions of the business enterprise's capabilities. In some embodiment, the system provides at least one gateway to serve a supergraph partition, which is declaratively configured and deployed using the global registry's portal. In some embodiments, the business enterprise reuses subgraphs and resolvers within subgraphs across these partitions, thereby permitting shared infrastructure and code as well as reducing cost of development time, maintenance, and infrastructure. Automated supergraph partitions also improve time to market for consumers by promoting code reuse and reducing the cognitive load that would otherwise be required for traversing large enterprise supergraphs to find their required business-relevant capabilities. In general, centralizing the configuration and management of federated subgraphs and supergraph partitions enables automated enforcement of standards, thus ensuring software quality and uniformity.

In various embodiments, the present invention features a global registry that provides discoverability of the subgraphs defined in the ecosystem regardless of supergraphs. In various embodiments, the present invention features an automated process for creating and deploying subgraphs compatible with the ecosystem. In various embodiments, the present invention features an automated process for registering one or more subgraphs to one or more supergraphs via the global registry. Overall, the present invention supports the creation and management of GraphQL Federated system on demand.

In one aspect, the present invention features a computer-implemented system for configuring and managing a federation ecosystem implemented in a data query language and comprising a plurality of subgraphs. Each subgraph represents a self-contained microservice. The computer-implemented system includes a sandbox registry in communication with the plurality of subgraphs. The sandbox registry is configured to test and verify changes to the plurality of subgraphs to ensure validity of the subgraphs. The computer-implemented system also includes a global registry in communication with the sandbox registry. The global registry is configured to register the subgraphs after the subgraphs are tested and verified by the sandbox registry. The computer-implemented system further includes a portal in communication with the global registry. The portal is configured to present to a user the plurality of subgraphs registered with the global registry and receive from the user instructions for combining two or more of the plurality of subgraphs to form at least one supergraph. The global registry is adapted to automatically (i) compose and deploy the supergraph based on the two or more subgraphs specified in the user instructions and (ii) centrally manage a life cycle of the supergraph that is mapped to the two or more subgraphs registered with the global registry.

In another aspect, the present invention features a computer-implemented method for managing a federation ecosystem implemented in a data query language. The computer-implemented method includes presenting to a user, by a portal in communication with a global registry, information related to a plurality of subgraphs registered with the global registry, including allowing the user to discover and explore the plurality of subgraphs and browse functionalities of the plurality of subgraphs. Each subgraph represents a self-contained microservice. The global registry is in communication with a sandbox registry that is configured to provide the information about the plurality of subgraphs to the global registry after testing and verifying the subgraphs. The method also includes receiving from the user, via the portal, instructions for combining two or more of the plurality of subgraphs to form at least one supergraph and automatically composing and deploying, by the global registry, the supergraph based on the two or more subgraphs specified in the user instructions. The method further includes centrally managing, by the global registry, a life cycle of the supergraph, wherein the supergraph is mapped to the two or more subgraphs registered with the global registry.

Any of the above aspects can include one or more of the following features. In some embodiments, the system includes a gateway in communication with the global registry and the supergraph. The gateway is configured to orchestrate service and deployment of the supergraph at runtime. In some embodiments, the portal is configured to allow the user to select options for configuring the gateway in association with the supergraph. In some embodiments, the portal is further configured to allow the user to discover and explore the subgraphs registered with the global registry and browse functionalities of the subgraphs.

In some embodiments, the system includes a plurality of supergraphs centrally managed by the global registry. Each supergraph is formed by the global registry based on user instructions provided via the portal using a combination of two or more of the plurality of subgraphs registered with the global registry. In some embodiments, at least one subgraph in the plurality of subgraphs is used to compose two or more of the plurality of supergraphs. In some embodiments, a continuous integration (CI) pipeline is configured to publish the plurality of subgraphs to the sandbox registry. In some embodiments, if a subgraph in the plurality of subgraphs is associated with a supergraph in the plurality of supergraphs, the CI pipeline is configured to perform access control and schema validation checks on the subgraph against the corresponding supergraph.

In some embodiments, the global registry manages the life cycle of the supergraph by performing at least one of (i) automatically updating the supergraph when an update occurs to at least one of the subgraphs based on which the supergraph is formed, or (ii) automatically removing the supergraph from the federation ecosystem when the supergraph is obsolete. In some embodiments, the global registry is configured to maintain an audit trail that defines the subgraphs and maps the subgraphs to corresponding ones of the supergraphs in the federation ecosystem.

In some embodiments, the global registry is configured to verify that the user instructions for composing the supergraph complies with a set of predefined policies and do not violate access rules associated with the two or more subgraphs used to form the supergraph. In some embodiments, the data query language is GraphQL.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
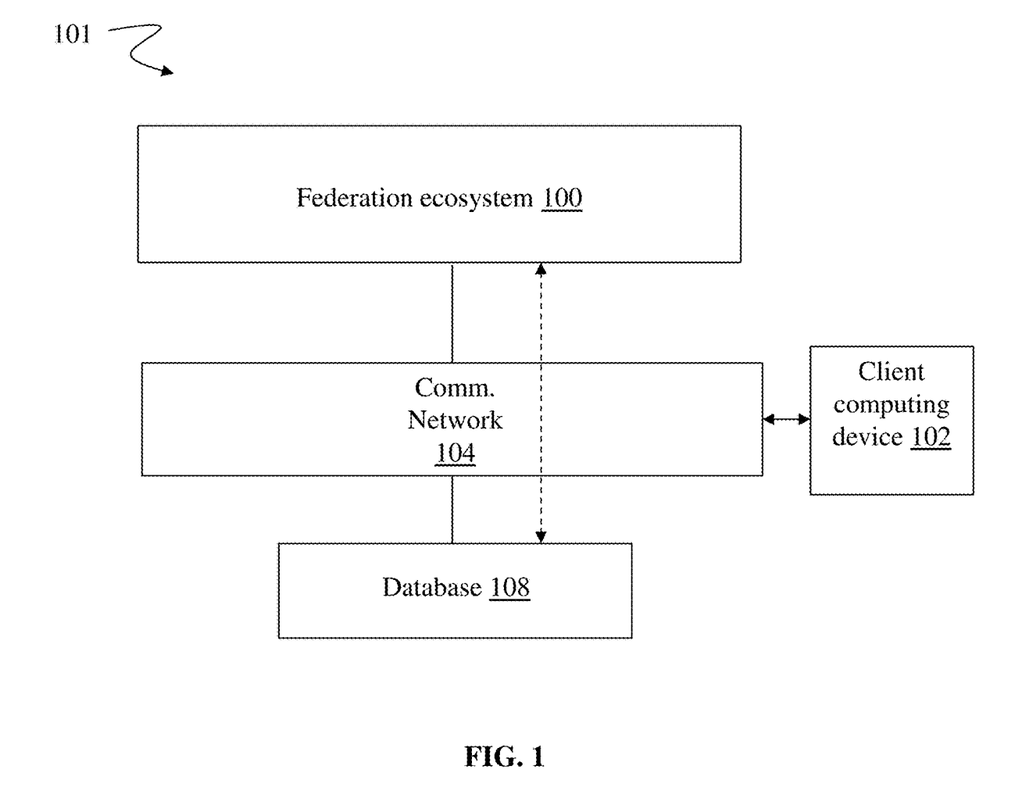
FIG. 1 shows an exemplary computing environment for configuring and managing a federation ecosystem, according to some embodiments of the present invention.

FIG. 1 shows an exemplary computing environment 101 for configuring and managing a federation ecosystem (e.g., a GraphQL ecosystem) 100, according to some embodiments of the present invention. As shown, the computing environment 101 generally includes at least one client computing devices 102, a communication network 104, the federation ecosystem 100 and at least one database 108.

The client computing device 102 can connect to the communication network 104 to communicate with the ecosystem 100 to provide inputs and receive outputs for configuring and maintaining the ecosystem 100 as described herein. Exemplary computing devices 102 include, but are not limited to, telephones, desktop computers, laptop computers, tablets, mobile devices, smartphones, and internet appliances. It should be appreciated that other types of computing devices capable of connecting to the components of the computing system 101 can be used without departing from the scope of invention.

The communication network 104 enables components of the computing environment 101 to communicate with each other. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the computing environment 101 to communicate with each other.

The federation ecosystem 100 is a combination of hardware, including one or more processors and one or more physical memory modules and specialized software engines that execute on the processor of the ecosystem 100, to receive data from other components of the computing environment 101, transmit data to other components of the computing environment 101, and perform functions as described herein. In some embodiments, the components of the ecosystem 100 are specialized sets of computer software instructions programmed onto a dedicated processor in the ecosystem 100 and can include specifically-designated memory locations and/or registers for executing the specialized computer software instructions. Details regarding this ecosystem 100 are provided below in relation to FIG. 2.

The database 108 is a computing device (or in some embodiments, a set of computing devices) that is coupled to and in communication with the ecosystem 100 and is configured to provide, receive, and store various types of data received and/or created for the purpose of ecosystem management. In some embodiments, all or a portion of the database 108 is integrated with the ecosystem 100 or located on a separate computing device or devices. For example, the database 108 can comprise one or more databases, such as MySQL™ available from Oracle Corp. of Redwood City, California.

Figure 2:
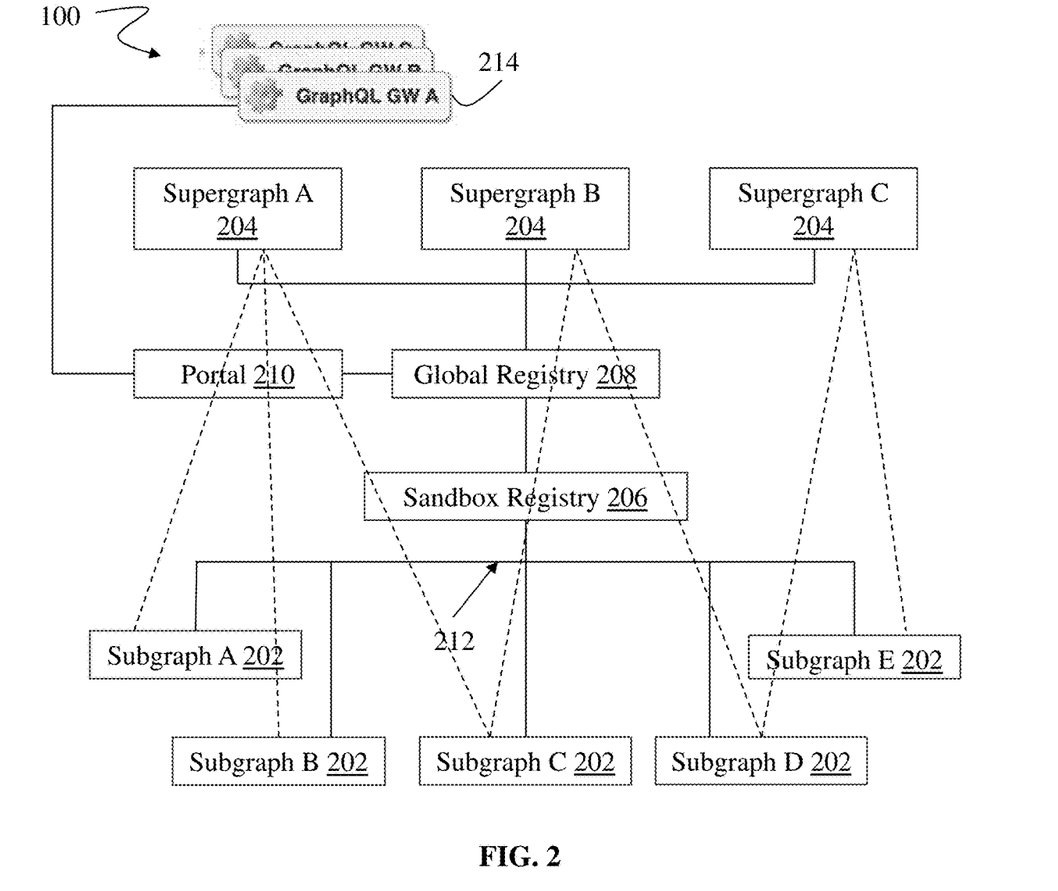
FIG. 2 shows an exemplary configuration of the federation ecosystem of FIG. 1, according to some embodiments of the present invention.

FIG. 2 shows an exemplary configuration of the federation ecosystem 100 of FIG. 1, according to some embodiments of the present invention. The ecosystem 100 can be implemented in a data query language, such as a GraphQL. As shown, the ecosystem 100 generally includes multiple subgraphs 202, each representing a self-contained microservice. A subgraph 202 can be only concerned with its own domain implementation, including resolvers and schema. In some embodiments, each subgraph 202 is designed and implemented in GraphQL's Schema Definition Language (SDL). A user, via his or her computing device 102, can instruct the ecosystem 100 to organize one or more of the subgraphs 202 into a supergraph partition 204 using components and methods described below. Based on user instructions, the ecosystem 100 can automatically create supergraph partitions 204 using flexible declarative configurations and subgraph discovery. Moreover, components of the ecosystem 100 can provide functions including automated subgraph publishing, supergraph partitions composition, and deployment and life cycle management of the subgraphs 202 and supergraph partitions 204. As shown in FIG. 2, these components can include a sandbox registry 206, a global registry 208, and a user portal 210.

The sandbox registry 206, in communication with the multiple subgraphs 202, is configured to test and verify changes to the subgraphs 202 to ensure the validity of the subgraphs 202 before moving the subgraphs 202 to the global registry 208. In some embodiments, the federation ecosystem 100 also includes a continuous integration (CI) pipeline 212 configured to publish schemas associated with the subgraphs 202 to the sandbox registry 206. In addition, the CI pipeline 212 can publish the subgraphs 202 to a runtime environment (e.g., a container running in a Kubernetes cluster). In operation, the sandbox registry 206, in connection with the CI pipeline 212, can perform access control and schema validation checks in relation to the subgraphs 202 to ensure that they are safe to publish to the global registry 208, from which they are further published to one or more associated supergraph partitions 204. Exemplary schema validation checks include syntactical correctness of the schema (i.e., syntax checks), compliance with naming conventions and entity schema patterns (i.e., linting), and conflict checks when combining the subgraphs 202 (i.e., composition checks). In some embodiments, a subgraph 202 may be published without having any association to a supergraph 204, in which case the subgraph 202 is ready for immediate consumption on passing the tests. In some embodiments, GraphQL resolvers are held to the same level of scrutiny by the sandbox registry 206 with automated testing to confirm their validity. In some embodiments, the sandbox registry 206 uses a linter to automatically execute policies against the SDL used to design and implement the subgraphs 202.

Figure 3:
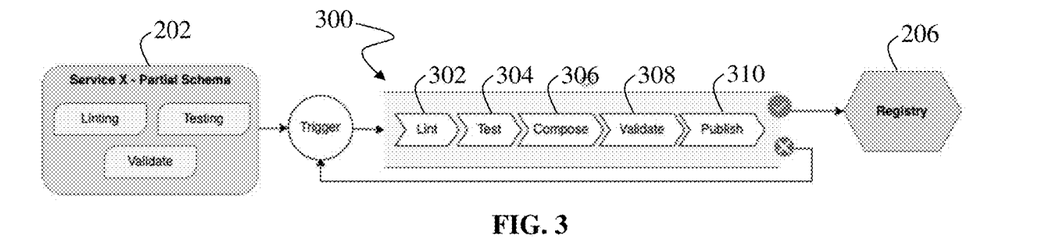
FIG. 3 shows an exemplary process of continuous integration using the CI pipeline of the federation ecosystem of FIG. 2, according to some embodiments of the present invention.

FIG. 3 shows an exemplary process 300 of continuous integration using the CI pipeline 212 of the federation ecosystem 100 of FIG. 2, according to some embodiments of the present invention. As shown, for a given subgraph 202, the process 300 starts with a linting stage 302 to enforce proper conventions and standards within the schema associated with the subgraph 202. This normalizes the subgraph 202, allowing for lower cost of context switching between multiple subgraphs. Next at the testing stage 304, unit tests and end-to-end tests are executed to ensure functional requirements are met and that code quality is high. Composition 306 then follows the testing stage 304, ensuring that there are no collisions between types defined in separate subgraphs. This composition operation 306 produces a supergraph artifact that can be validated 308, published to 310 and stored in the sandbox registry 206 for future deployments.

In some embodiments, because a subgraph 202 can potentially be associated with multiple supergraph partitions 204, registering a subgraph 202 requires the sandbox registry 206 to check against all the supergraph partitions 204 in the ecosystem 100 that are recognized by the sandbox registry 206. Failure of schema validation checks associated with a particular subgraph 202 means that the subgraph 202 cannot be published and revisions are needed. Alternatively, if a subgraph 202 passes the tests applied by the sandbox registry 206, the subgraph 202 is merged to the global registry 208.

Referring back to FIG. 2, the global registry 208, in communication with the sandbox registry 206, is configured to register the subgraphs 202 after the subgraphs 202 are tested and verified by the sandbox registry 206. The global registry 208 maintains information about the subgraphs 202 registered, regardless of their scopes. The global registry 208 can obtain such information from the sandbox registry 206, which should be in a valid state. For example, the global registry 208 can create and maintain an audit trail that stores information about each subgraph 202, including information (i) defining the subgraph 202, (ii) adding metadata to each subgraph 202 needed for internal processing by the various components of the ecosystem 100, and/or (iii) mapping the subgraph 202 to the associated supergraph partitions 204 registered with the global registry 208. In some embodiments, the global registry 208 stores the subgraph information in the database 108. In some embodiments, the global registry 208 is configured to deploy the subgraph at runtime. In some embodiments, the global registry 208 updates components serving the supergraph partitions 204. In general, the global registry 208 implements tools that support the many-to-many, subgraph-to-supergraph relationships and track these interactions.

The user portal 210, in communication with the global registry 208, is configured to allow a user to customize and define a supergraph partition 204 based on one or more of the available subgraphs 202 as the ecosystem 100 as well as customize and define configurations exposed to cross-cutting concerns. In some embodiments, subgraphs 200 register themselves to the portal 210 via the global registry 208. The global registry 208 is adapted to include all the subgraphs 202 that are available for the consumer to choose and configure via the portal 210. In some embodiments, a consumer has the ability to choose the relevant subgraphs 202 needed for one or more desired use cases. The consumer can also obtain information about ownership and/or supported nonfunctional requirements (e.g., supported transactions per second (TPS)). Based on this information, the consumer can select the subgraphs 202 that support their functional and non-functional requirements in the resulting supergraphs 204. For example, the user portal 210 can (i) present to the user information related to the set of subgraphs 202 registered with the global registry 210 and (ii) receive from the user instructions for combining two or more of the subgraphs 202 to form at least one supergraph 204. In general, the portal 210 can allow a user to discover and explore the subgraphs 202 registered with the global registry 208 and browse functionalities of the subgraphs 202. However, in some embodiments, the user does not have access to information related to those subgraphs 202 that did not pass the tests/checks applied by the sandbox registry 206.

In some embodiments, the user creates a supergraph partition 204 via the portal 210 by selecting the desired subgraphs 202 and/or the desired cross-cutting concern configurations with values specific to his/her business need. Cross-cutting concerns captured by the portal 210 can include security, performance, observability and configuration. Exemplary parameters configurable by a user to address security concerns include headers and authorization metadata to use at runtime by the system. Exemplary parameters configurable by a user to address performance concerns include query cost parameters, and weights used to calculate query cost analysis. Exemplary parameters configurable by a user to address observability concerns include specifying how and where to send traffic information. Exemplary parameters configurable by a user to address configuration concerns include selection of subgraphs to associate to a supergraph, middleware configuration settings including authorization, authentication, CORS, CSRF, query cache, circuit breaker, health check, error handling, rate limiting settings, timeouts, etc., and related metadata for supergraphs and subgraphs. In general, all services available in the ecosystem 100 are discoverable via the portal 210 if they are configured to be globally available via the global registry 208. In some embodiments, after user configuration of a supergraph is complete, the user portal 210 is adapted to validate the supergraph composition. If there are any errors, the portal 210 reports them to the consumer to remedy.

Upon receiving user instructions via the user portal 210, the global registry 208 verifies that the user instructions for composing a supergraph partition 204 complies with a set of predefined policies and do not violate access rules associated with the subgraph(s) 202 specified to form the desired supergraph partition 204. Then, the global registry 206 locates the two or more subgraphs 202 registered with the global registry 206 as specified in the user instructions and automatically composes and deploys the newly-formed supergraph 204. In some embodiments, a subgraph 202 in the ecosystem 100 can be used to construct any number of supergraph partitions 204, subject to access rules associated with the subgraphs 202. For example, at least one of the subgraphs 202 can be used to compose two or more of the supergraph partitions 204. For example, as shown in FIG. 2, Subgraph C is used to form both Supergraph A and Supergraph B, and Subgraph D is used to form both Supergraph B and Supergraph C. Thus, the ecosystem 100 supports reusability of subgraphs 204 across supergraph partitions 204.

The global registry 208 can also centrally manage a life cycle of each supergraph 204 that is mapped to one or more of the subgraphs 202 in the ecosystem 100. In some embodiments, the global registry 208 manages the life cycle of a supergraph partition 204 by performing at least one of (i) automatically updating the supergraph partition 204 when an update occurs to at least one of the subgraphs 202 based on which the supergraph partition 204 is formed, or (ii) automatically removing the supergraph partition 204 from the federation ecosystem 100 when the supergraph partition 204 is obsolete.

In some embodiments, the federation ecosystem 100 further includes one or more gateways 214, where each gateway 214 is in communication with the user portal 210 and the global registry 208, including one or more of the supergraph partitions 204 that are created and managed by the global registry 208. For example, each supergraph partition 204 can be assigned to one of the gateways 214 in the ecosystem 100, where each gateway 214 functions as an orchestrating component in the distributed microservice federation ecosystem 100 by orchestrating services and deployment of the associated supergraph partitions 204 at runtime. Therefore, each gateway 214 is adapted to expose a single API endpoint for client consumption at runtime. In some embodiments, the user portal 210 allows a user to select options for configuring a gateway 214, including configuring all related cross-cutting concerns and selecting one or more subgraphs 202 to link to a supergraph partition 204 associated with the gateway 214. In some embodiments, after a user defines criteria for creating a supergraph 204 via the portal 210, such as selecting the related subgraphs 202 and the corresponding configurations, a declarative configuration for a gateway 214 of the desired supergraph 204 is generated, which is then used by an execution engine to instantiate and deploy a new gateway application for the desired supergraph 204.

Figure 4:
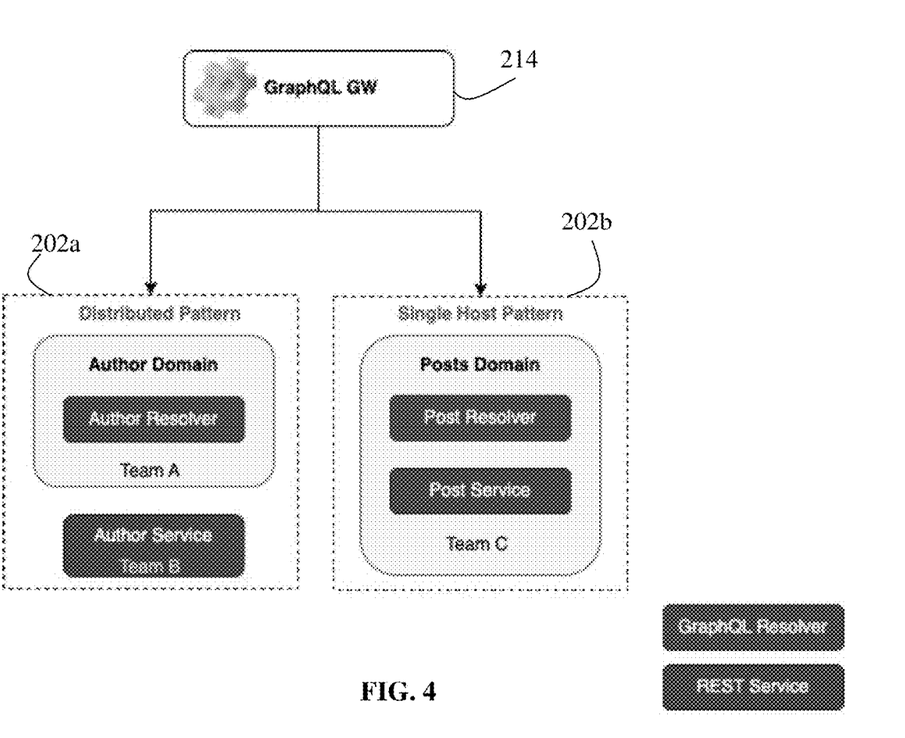
FIG. 4 shows an exemplary configuration of the gateway of the federation ecosystem of FIG. 2, according to some embodiments of the present invention.

FIG. 4 shows an exemplary configuration of the gateway 214 of the federation ecosystem 100 of FIG. 2, according to some embodiments of the present invention. In general, the gateway 214 is responsible for creating query plans that may span multiple subgraphs 202. These subgraphs 202 can be implemented in a variety of ways as long as they comply with the federation specification. As shown FIG. 4, there are two different exemplary subgraphs 202a, 202b, implemented in two different ways. The first subgraph 202a follows a distributed model where the subgraph 202a acts as a proxy to upstream services that can be wholly owned by a separate team from the team implementing the subgraph 202a itself. The second subgraph 202b can be implemented in the scenario where the owner of subgraph 202b and underlying service is the same. In both of these approaches, the subgraphs 202a, 202b can be deployed independent of each other and of the gateway 214. This decoupling can be critical to scaling the process across many teams.

Referring back to FIG. 2, in some embodiments, the portal 210 is configured to publish a supergraph partition 204 to the corresponding gateway 214. As shown in FIG. 2, the portal 210 can manage a fleet of gateways 214 as necessary. In some embodiments, all the gateways 214 have a common binary, but the schema and configurations can differ based on the configurations made on the portal 210. During the supergraph schema publishing process, if needed the user portal 210 can create new infrastructure with common gateway binary and push the supergraph schema and configuration needed. In some embodiments, these gateways 214 can automatically scale based on incoming traffic.

Figure 5:
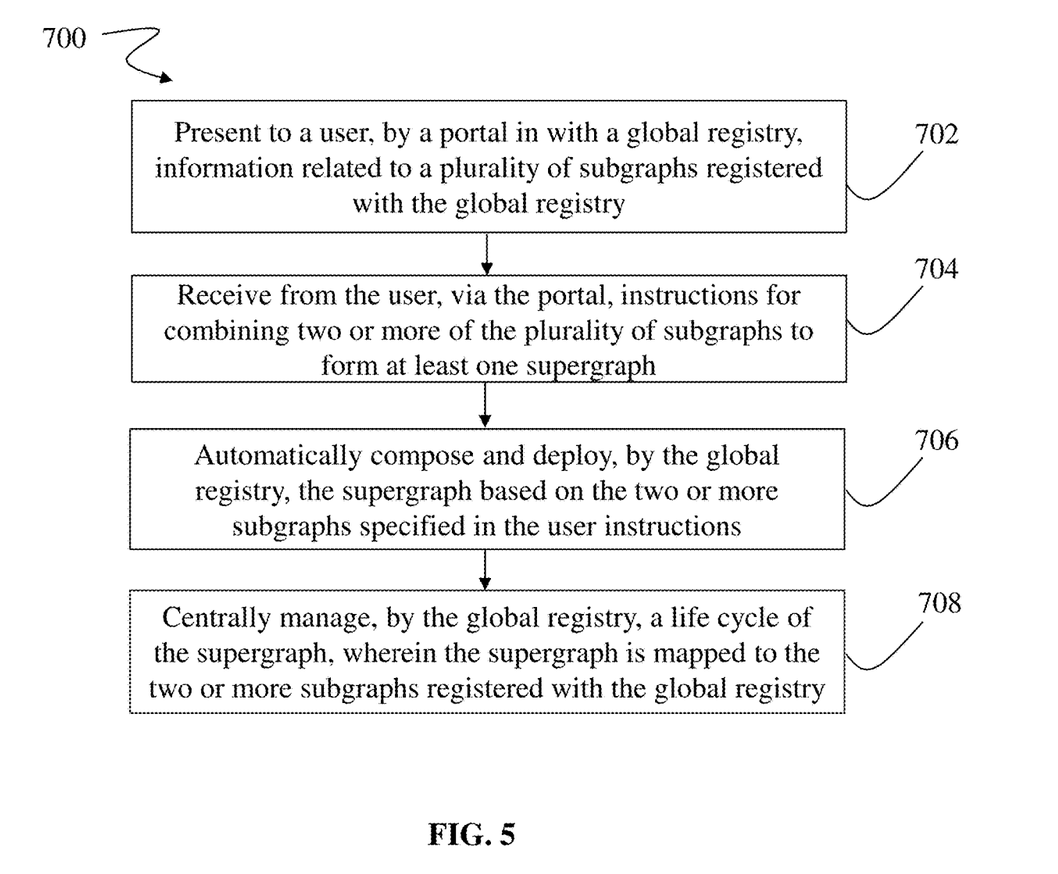
FIG. 5 shows an exemplary method for allowing a user to create a supergraph using the federation ecosystem of FIG. 2, according to some embodiments of the present invention.

FIG. 5 shows an exemplary method 700 for allowing a user to create a supergraph 204 using the federation ecosystem 200 of FIG. 2, according to some embodiments of the present invention. The supergraph 204 can be composed based on two or more subgraphs 202 in the ecosystem 200, where each subgraph represents a self-contained microservice. Thus, the resulting supergraph 204 represents a customized combination of the microservices associated with the constituent subgraphs.

At step 702, the user is presented with the portal 210 of the ecosystem 200, through which the user is allowed to discover and explore the set of subgraphs 202 available and registered with the global registry 208 of the ecosystem 200, as well as browse functionalities and other information associated with these subgraphs 202. The information presented by the portal 210 includes options selectable by the user to configure a gateway in association with the desired supergraph 204, where the gateway is adapted to orchestrate the deployment of the supergraph 204.

At step 704, the ecosystem 200, via the portal 210, receives instructions from the user for combining two or more of the set of subgraphs 202 to form at least one supergraph 204. In addition, the user can customize and define, via the portal 210, configurations exposed to cross-cutting concerns. Further, the user can adjust middleware settings configurations, including but not limited to, rate limiting settings, request headers, timeouts, etc.

At step 706, the global registry 208 automatically composes a supergraph 204 based on instructions received from the user and automatically deploys the supergraph 204 in the ecosystem 100 in a manner stipulated in the user instructions. In some embodiments, the global registry 208 implements a declarative configuration for the gateway of the desired supergraph 204, which is then used by an execution engine to instantiate and deploy the gateway for the desired supergraph 204.

At step 708, after the user-specified supergraph 204 is successfully created and deployed, the global registry 208 is adapted to centrally manage a life cycle of the supergraph 204 mapped to its constituent subgraphs 202. In some embodiments, the global registry 208 manages the life cycle of a supergraph 204 by performing at least one of (i) automatically updating the supergraph 204 when an update occurs to at least one of the subgraphs 202 based on which the supergraph 204 is formed, or (ii) automatically removing the supergraph 204 from the federation ecosystem 100 when the supergraph 204 is obsolete.

Figure 6:
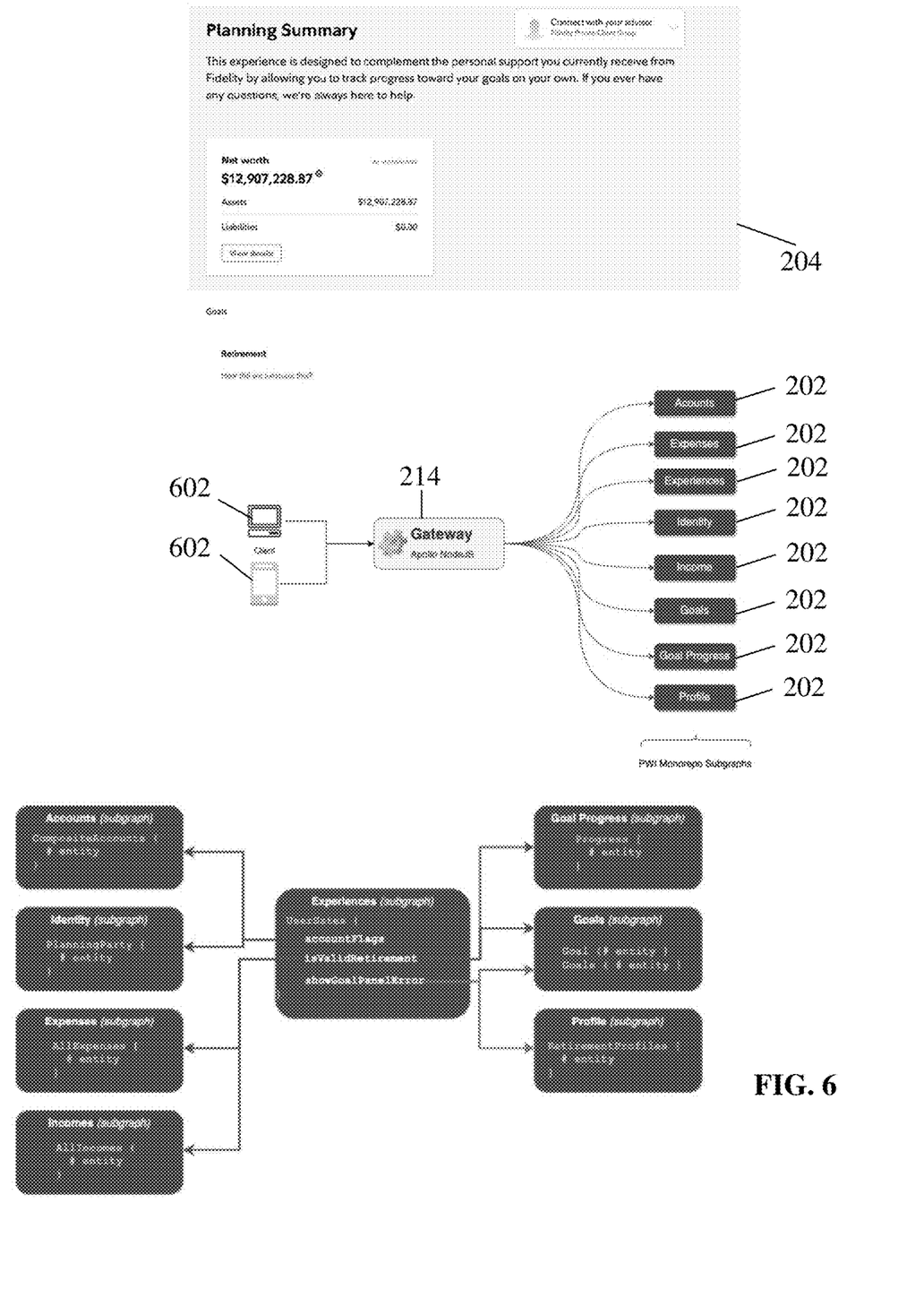
FIG. 6 shows an exemplary implementation using several components of the federation ecosystem of FIG. 2, according to some embodiments of the present invention.
Figure 7A:
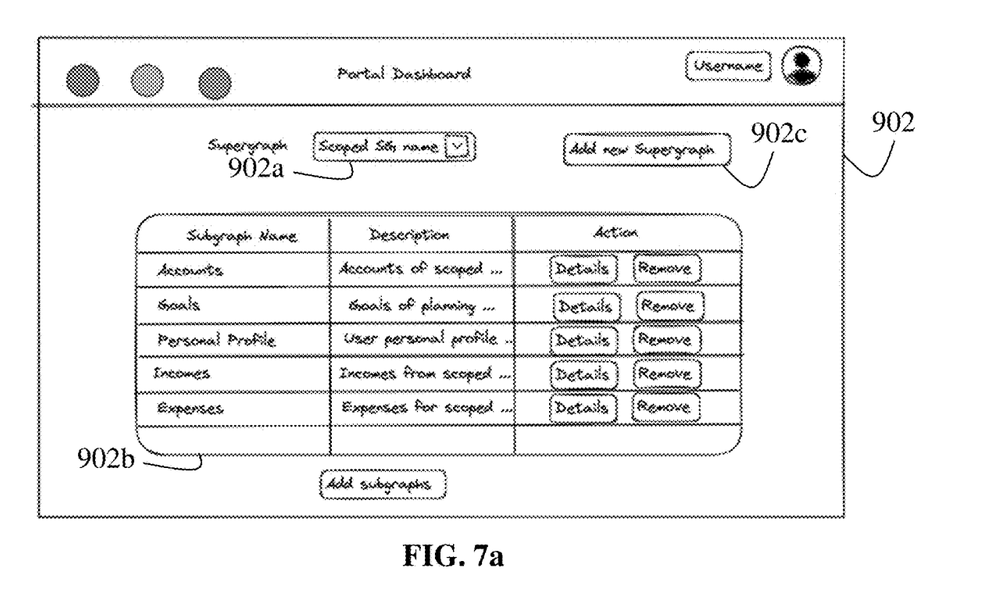
FIGS. 7a and 7b show exemplary graphical user interfaces presented by the portal of the federation ecosystem of FIG. 2, according to some embodiments of the present invention.
Figure 7B:
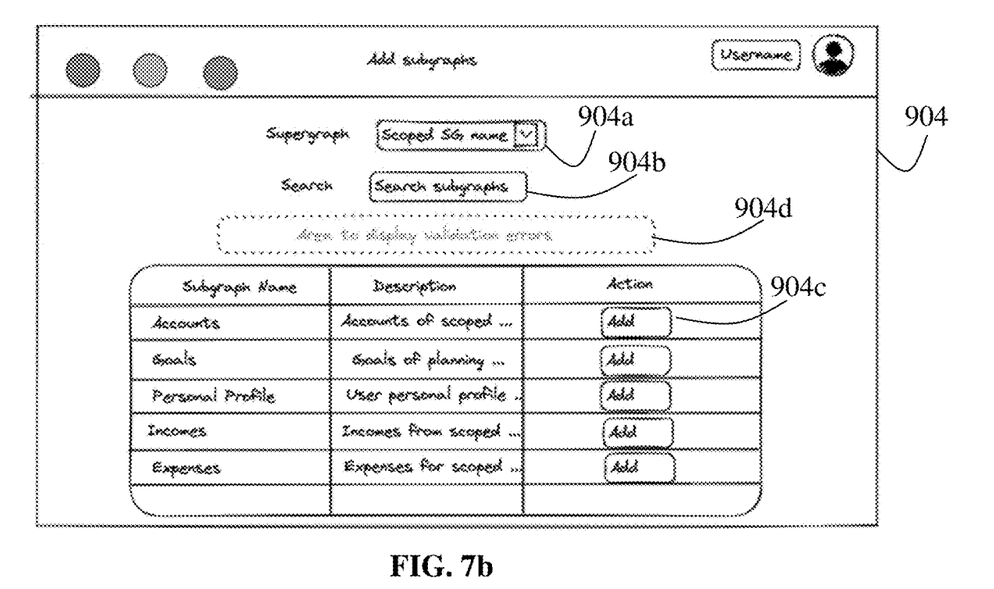

FIG. 6 shows an exemplary implementation using several components of the federation ecosystem 100 of FIG. 2, including microservices referred to as subgraphs 202, a supergraph 204 and the sandbox registry 206. More specifically, the application of FIG. 6 defines eight microservices (i.e., subgraphs) with domain-specific capabilities, including Accounts, Expenses, Experiences, Identity, Income, Goals, Goal Progress and Profile. The subgraphs 202 can be deployed as a supergraph 204 that combine the services of the subgraphs 202 and are invoked by the gateway 214 to execute requests by client devices 602. As shown in FIG. 6, the supergraph 204 can provide a single interface that allows a user to access information provided by the microservices of the subgraphs 202. There are two components in terms of deploying these microservices: (i) runtime, which is a subgraph GraphQL server holding resolver definitions and (ii) schema registration, which is the "subgraph" or schema definition language. For schema registration, each subgraph 202 is published to the sandbox registry 206. If a subgraph 202 composes successfully, registration takes place and the subgraph is merged into the supergraph 204 and compose as a unified graph. In the event of an error, the registration is rejected until the subgraph 202 is corrected and can be merged into the supergraph 204. The runtime is done separately through a CI/CD process. In the application in FIG. 6, there are eight subgraphs 202 published to the sandbox registry 206, which composes the supergraph 204 to pass to the gateway 214. The gateway 214 may read this supergraph SDL on bootstrap or it may be updated via an event. The gateway 214 can be a GraphQL server as well, which has a different function from the subgraphs 202 as the gateway 214 orchestrates calls to the different services with the metadata provided in the supergraph SDL. It then resolves responses given by each service in the system to the requesting clients 602. FIGS. 7a and 7b show exemplary graphical user interfaces 902, 904 presented by the portal 210 of the federation ecosystem 200 of FIG. 2, according to some embodiments of the present invention. The GUI 902 of FIG. 7a presents a main portal dashboard from which the user can explore the subgraphs 202 and supergraphs 204 available in the ecosystem 200. For example, pulldown menu 902a provides the user with a list of available supergraphs 204, the selection of a particular one by the user triggers the display of a list 902b of subgraphs 202 used to compose the supergraph 204. The user can explore these subgraphs 202 by reviewing their detailed information or remove a particular subgraph 202 from being a part of the supergraph 204 selected from the pulldown menu 902a. In addition, the user can create a new supergraph 204 to add to the federation ecosystem 200 by activating an "Add New Supergraph" button 902c. If the "Add New Supergraph" button 902c is clicked by the user, the portal 210 is adapted to present the GUI 904 of FIG. 7b, from which the user can customize a new supergraph 204, along with various related configurations. Specifically, the GUI 904 includes a field 904a for naming the new supergraph, a search field 904b for allowing the user to search for desired subgraphs 202 to form the new supergraph 204, and a button 904c for adding each discovered subgraph 202 to the new supergraph 204. In some embodiments, the GUI 904 also includes an area 904d to display any validation errors associated with the resulting supergraph 204, in which case the portal 210 can prevent the supergraph 204 from being generated and/or deployed.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

The invention claimed is:

1. A computer-implemented system for configuring and managing a federation ecosystem implemented in a data query language and comprising a plurality of subgraphs, each subgraph representing a self-contained microservice, the computer-implemented system comprising:
   a sandbox registry in communication with the plurality of subgraphs, the sandbox registry configured to test and verify changes to the plurality of subgraphs to ensure validity of the subgraphs;
   a global registry in communication with the sandbox registry, the global registry configured to register the subgraphs after the subgraphs are tested and verified by the sandbox registry;
   a plurality of gateways in communication with the global registry; and
   a portal in communication with the global registry, the portal configured to present to one or more users the plurality of subgraphs registered with the global registry and receive from the one or more users: (i) instructions for combining two or more of the plurality of subgraphs to form respective ones of a plurality of supergraphs, and (ii) selections among the plurality of gateways to deploy the respective ones of the supergraphs,
   wherein the global registry is adapted to centrally manage the plurality of supergraphs by automatically (i) composing each of the plurality of supergraphs based on the two or more subgraphs specified in the user instructions for each supergraph, (ii) communicating with the selected gateways for respective ones of the plurality of supergraphs to orchestrate service and deployment of the corresponding supergraphs at runtime, and (iii) managing a life cycle of each of the plurality of supergraphs that is mapped to the corresponding two or more subgraphs registered with the global registry.

2. The computer implemented system of claim 1, wherein the portal is configured to allow each of the one or more users to select options for configuring the selected gateway in association with the corresponding one of the plurality of supergraphs.

3. The computer implemented system of claim 2, wherein the portal is further configured to allow the user to discover and explore the subgraphs registered with the global registry and browse functionalities of the subgraphs.

4. The computer-implemented system of claim 1, wherein at least one subgraph in the plurality of subgraphs is used to compose two or more of the plurality of supergraphs.

5. The computer-implemented system of claim 1, further comprising a continuous integration (CI) pipeline configured to publish the plurality of subgraphs to the sandbox registry.

6. The computer-implemented system of claim 5, wherein if a subgraph in the plurality of subgraphs is associated with a supergraph in the plurality of supergraphs, the CI pipeline is configured to perform access control and schema validation checks on the subgraph against the corresponding supergraph.

7. The computer-implemented system of claim 1, wherein the global registry is configured to verify that the user instructions for composing the plurality of supergraphs comply with a set of predefined policies and do not violate access rules associated with the two or more subgraphs used to form each of the plurality of supergraphs.

8. The computer-implemented system of claim 1, wherein the global registry manages the life cycle of each of the plurality of supergraphs by performing at least one of (i) automatically updating the supergraph when an update occurs to at least one of the subgraphs based on which the supergraph is formed, or (ii) automatically removing the supergraph from the federation ecosystem when the supergraph is obsolete.

9. The computer-implemented system of claim 1, wherein the global registry is configured to maintain an audit trail that defines the subgraphs and maps the subgraphs to corresponding ones of the supergraphs in the federation ecosystem.

10. The computer-implemented system of claim 1, wherein the data query language is GraphQL.

11. A computer-implemented method for managing a federation ecosystem implemented in a data query language, the computer-implemented method comprising:
presenting to one or more users, by a portal in communication with a global registry, information related to a plurality of subgraphs registered with the global registry, including allowing each of the one or more users to discover and explore, via the portal, the plurality of subgraphs and browse functionalities of the plurality of subgraphs, each subgraph representing a self-contained microservice, wherein the global registry is in communication with a sandbox registry that is configured to provide the information about the plurality of subgraphs to the global registry after testing and verifying the subgraphs;
receiving from the one or more users, via the portal, (i) instructions for combining two or more of the plurality of subgraphs to form respective ones of a plurality of supergraphs, and (ii) selections among a plurality of gateways to deploy the respective ones of the supergraphs; and
centrally managing, by the global registry, the plurality of supergraphs by:
automatically composing each of the plurality of supergraphs based on the two or more subgraphs specified in the user instructions for each supergraph;
communicating with the selected gateways for respective ones of the supergraphs to orchestrate service and deployment of the corresponding supergraphs at runtime; and
managing a life cycle of each of the plurality of supergraphs, wherein each supergraph is mapped to the corresponding two or more subgraphs registered with the global registry.

12. The computer-implemented method of claim 11, wherein the information presented by the portal includes options selectable by the user to configure the plurality of gateways in association with respective ones of the plurality of supergraphs.

13. The computer-implemented method of claim 11, wherein at least one subgraph in the plurality of subgraphs is used to compose two or more of the plurality of supergraphs.

14. The computer-implemented method of claim 11, further comprising publishing the plurality of subgraphs to the sandbox registry using a continuous integration (CI) pipeline.

15. The computer-implemented method of claim 14, further comprising, if a subgraph in the plurality of subgraphs is associated with a supergraph in the plurality of supergraphs, performing access control and schema validation checks on the subgraph against the corresponding supergraph by the CI pipeline.

16. The computer-implemented method of claim 11, wherein automatically composing each of the plurality of supergraphs comprises verifying by the global registry that the user instructions for composing the supergraph comply with a set of predefined policies and do not violate access rules associated with the two or more subgraphs used to form each of the plurality of supergraphs.

17. The computer-implemented method of claim 11, wherein centrally managing a life cycle of each of the plurality of supergraphs comprises performing, by the global registry, at least one of (i) automatically updating the supergraph when an update occurs to at least one of the subgraphs based on which the supergraph is formed, or (ii) automatically removing the supergraph from the federation ecosystem when the supergraph is obsolete.

18. The computer-implemented method of claim 11, wherein the data query language is GraphQL.

* * * * *